US012735121B2

(12) United States Patent
V et al.

(10) Patent No.: US 12,735,121 B2
(45) Date of Patent: Sep. 15, 2026

(54) ROOF ASSEMBLY FOR ROAD VEHICLE AND ROAD VEHICLE COMPRISING SUCH A ROOF ASSEMBLY

(71) Applicant: Volvo Truck Corporation, Gothenburg (SE)

(72) Inventors: Sri Gokulnath V, Tamil Nadu (IN); Gangaram Baliram Eakmbe, Maharashtra (IN); Prakash Y, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 169 days.

(21) Appl. No.: 18/935,784

(22) Filed: Nov. 4, 2024

(65) Prior Publication Data

US 2025/0153786 A1 May 15, 2025

(30) Foreign Application Priority Data

Nov. 9, 2023 (EP) .................................... 23208807

(51) Int. Cl.
*B62D 35/00* (2006.01)
*B60J 7/16* (2006.01)
*B60J 7/22* (2006.01)

(52) U.S. Cl.
CPC .......... *B62D 35/001* (2013.01); *B60J 7/1642* (2013.01); *B60J 7/22* (2013.01)

(58) Field of Classification Search
None
See application file for complete search history.

(56) References Cited

U.S. PATENT DOCUMENTS 4,006,931 A * 2/1977 Groves ................ B62D 35/001 296/180.3
4,379,583 A 4/1983 Taylor et al.
(Continued)

FOREIGN PATENT DOCUMENTS

CN 111422263 A 7/2020
DE 2913834 A1 10/1980
(Continued)

OTHER PUBLICATIONS

European Search Report for European Patent Application No. 23208807.0 completed Apr. 6, 2024, 2 pages.

*Primary Examiner* — Joseph D. Pape
(74) *Attorney, Agent, or Firm* — Withrow & Terranova, PLLC

(57) ABSTRACT

A roof assembly comprises a roof panel, a hatch mounted on the roof panel, a front deflector and a locking assembly to move the front deflector between a forward position and a backward position, and lock the front deflector in the forward and backward positions. The locking assembly comprises a magnetic connector, a spring exerting a force on the magnetic connector along a backward direction and an actuator configured to exert a force on the magnetic connector along a forward direction for moving the magnetic connector in the forward direction against the force exerted by the spring. The magnetic connector is magnetically coupled with a magnetic part of the front deflector so that the front deflector is in its forward position when the magnetic connector is in a forward position and so that the front deflector is in its backward position when the magnetic connector is in its backward position.

15 Claims, 9 Drawing Sheets

(56) References Cited

U.S. PATENT DOCUMENTS

| | | | | |
|---|---|---|---|---|
| 6,039,385 | A | 3/2000 | Husted | |
| 7,876,202 | B2 * | 1/2011 | Liljeblad | B62D 35/001 296/180.2 |
| 2019/0263455 | A1 | 8/2019 | Milton et al. | |

FOREIGN PATENT DOCUMENTS

| | | | | |
|---|---|---|---|---|
| DE | 4039485 | C1 * | 5/1992 | B60J 7/22 |
| DE | 19609049 | C1 | 4/1997 | |
| DE | 10229840 | A1 | 1/2004 | |
| EP | 0348069 | A2 * | 12/1989 | B60J 7/043 |
| EP | 1792809 | A2 | 6/2007 | |
| EP | 1792810 | A2 | 6/2007 | |
| EP | 1792810 | A3 | 10/2007 | |
| EP | 2834137 | B1 | 8/2016 | |
| EP | 3124324 | A1 | 2/2017 | |
| WO | 2012078096 | A1 | 6/2012 | |

* cited by examiner

ROOF ASSEMBLY FOR ROAD VEHICLE AND ROAD VEHICLE COMPRISING SUCH A ROOF ASSEMBLY

PRIORITY APPLICATIONS

The present application claims priority to European Patent Application No. 23208807.0, filed on Nov. 9, 2023, and entitled "ROOF ASSEMBLY FOR ROAD VEHICLE AND ROAD VEHICLE COMPRISING SUCH A ROOF ASSEMBLY," which is incorporated herein by reference in its entirety.

TECHNICAL FIELD

The disclosure relates generally to road vehicles. In particular aspects, the disclosure relates to a roof assembly for road vehicles and to a road vehicle comprising such a roof assembly. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

It is known to equip the roof of the cabin of road vehicles with air deflectors, to improve the aerodynamic of the vehicle. Such air deflectors are particularly useful for road vehicles comprising a tractor unit and a semi-trailer attached to the tractor unit, the tractor unit comprising a cabin. In such vehicles, an air deflector is generally provided on the roof of the cabin to obtain a more aerodynamic airflow between the tractor unit and the semi-trailer. To optimize the aerodynamic performance of the vehicle, it is known to place the air deflector as close to the front of the roof of the cabin.

It is also known to equip the roof of the cabin of such vehicles with a roof hatch, to allow a person inside the cabin to exit the cabin through the roof, in particular in case of emergency, such as after an accident rendering the doors of the cabin unusable.

However, such roof hatch prevents the deflector from extending to the front of the cabin roof, thus decreasing the aerodynamic performance of the vehicle.

Hence, there is a need to improve the aerodynamic performance of such vehicle while providing a roof hatch on the cabin roof.

SUMMARY

A first aspect of the disclosure concerns a roof assembly for a road vehicle, the road vehicle comprising a cabin, the roof assembly comprising:

- a roof panel, configured to cover the cabin,
- a roof hatch, mounted on the roof panel and openable for allowing a person to go through the roof panel via the opened roof hatch,
- a front deflector, configured to be slidably moveable between a forward position, in which the front deflector covers the roof hatch, and a backward position, in which the front deflector does not cover the roof hatch, the front deflector comprising at least one magnetic part, and
- at least one locking assembly, said at least one locking assembly being configured to move the front deflector between its forward and backward positions and to lock the front deflector in said forward and backward positions, said at least one locking assembly comprising:

- a housing,
- a magnetic connector, located inside the housing, wherein the magnetic connector is moveable relative to the housing along a forward direction, between a backward position and a forward position, the forward position being in the forward direction relative to the backward position, wherein the magnetic connector is configured to be magnetically coupled with one of the at least one magnetic part of the front deflector so that the front deflector is in its forward position when the magnetic connector is in its forward position and so that the front deflector is in its backward position when the magnetic connector is in its backward position,
- a first spring, exerting a force on the magnetic connector relative to the housing along a backward direction opposed to the forward direction, said force tending to move the magnetic connector in the backward direction towards its backward position, and
- an actuator, located at least partially inside the housing, configured to exert a force on the magnetic connector relative to the housing along the forward direction for moving the magnetic connector in the forward direction against the force exerted by the first spring, and configured to be actuated so as to drive the magnetic connector between its forward and backward positions.

The first aspect of the disclosure may seek to improve the aerodynamic performance of such vehicle while providing a roof hatch on the cabin roof. A technical benefit may include accommodating both the front deflector and the roof hatch, as the locking assembly allows moving the front deflector away from the roof hatch. Hence, the front deflector can be moved away from the hatch is case of emergency, by being by the locking assembly, thus allowing the opening of the hatch.

Optionally in some examples, including in at least one preferred example, said at least one locking assembly further comprises a second spring, exerting a force on the actuator relative to the housing along the backward direction, said force tending to move the actuator in the backward direction, and at least one stopper shearing bolt, preventing the actuator from being moved along the backward direction by the force exerted by the second spring. The at least one stopper shearing bolt is configured to break when the cabin of the road vehicle is subjected to a deceleration above a predetermined deceleration value and thereby release the movement of the actuator along the backward direction under the effect of the force exerted by the second spring. A technical benefit may include forcing the front deflector to move towards its backward position in case of an accident involving the road vehicle, by ejecting the actuator when the at least one stopper shearing bolt breaks, thanks to the second spring, thus moving the magnetic connector towards its backward position. Hence, after an accident, the front deflector does not prevent the roof hatch from being opened.

Optionally in some examples, including in at least one preferred example, the actuator is a pneumatic cylinder, the locking assembly comprises a cylinder shearing bolt, the cylinder shearing bolt sealing an opening in the pneumatic cylinder, the cylinder shearing bolt being configured to break when the cabin of the road vehicle is subjected to a deceleration above the predetermined deceleration value, and thereby free the opening in the pneumatic cylinder, and the pneumatic cylinder is configured to drive the magnetic connector in its forward position when the cylinder shearing bolt seals the opening and the pneumatic cylinder is pressurized, the pneumatic cylinder being depressurized when the opening is freed by the breaking of the cylinder shearing bolt. A technical benefit may include forcing the front deflector to move towards its backward position in case of an accident involving the road vehicle, by forcing a depressurization of the actuator when the cylinder shearing bolt breaks, thus moving the magnetic connector towards its backward position. Hence, after an accident, the front deflector does not prevent the roof hatch from being opened.

Optionally in some examples, including in at least one preferred example, the pneumatic cylinder comprises a piston, the force exerted by the pneumatic cylinder on the magnetic connector being exerted by the piston, the piston extending in the housing. A technical benefit may include protecting the piston inside the housing to prevent accidental damages of the pneumatic cylinder and ensure safe operation of the locking assembly.

Optionally in some examples, including in at least one preferred example, the pneumatic cylinder is a telescopic pneumatic cylinder. A technical benefit may include obtaining a pneumatic cylinder with an increased course, allowing greater amplitude of movement of the magnetic connector and therefore of the front deflector.

Optionally in some examples, including in at least one preferred example, the locking assembly further comprises a hinged door, connected to one end of the housing in the backward direction, the hinged door being moveable between an open configuration in which the hinged door does not close said end of the housing and a closed configuration in which the hinged door closes said end of the housing. The hinged door is configured to move from its open configuration towards its closed configuration when the actuator exit the housing under the effect of the force exerted by the second spring and to prevent the actuator from moving back into the housing. A technical benefit may include avoiding a reentry of the actuator into the housing after an accident involving the road vehicle, which could prevent the roof hatch to be opened in case of emergency.

Optionally in some examples, including in at least one preferred example, the predetermined deceleration value is greater than or equal to 2G. A technical benefit may include differentiate accidents from strong braking of the road vehicle and thus automatically move the front deflector towards its backward position only after an accident involving the road vehicle.

Optionally in some examples, including in at least one preferred example, the front deflector comprises at least one roller configured to roll over the roof panel when the front deflector moves between its forward and backward positions for guiding the front deflector between its forward and backward positions. The at least one magnetic part of the front deflector comprises a magnetic ring surrounding said at least one roller. A technical benefit may include improving the movement of the front deflector between its forward and backward positions and thus avoiding blockages of the front deflector. Furthermore, surrounding said roller with a magnetic ring allows for a better contact between said roller and the roof panel.

Optionally in some examples, including in at least one preferred example, the roof hatch comprises two panels, mutually hinged, and the roof hatch being configured to be open foldably. A technical benefit may include reducing the footprint of the roof hatch and therefore facilitating its opening while allowing the roof hatch to be opened towards the inside or towards the outside of the cabin.

Optionally in some examples, including in at least one preferred example, the roof panel comprises two longitudinal rails. A first panel of the roof hatch is hinged to the roof panel, a second panel of the roof hatch comprises two rollers and the two rollers of the second panel are received into the two longitudinal rails of the roof panel. A technical benefit may include improving the opening of the roof hatch, making it easier to evacuate a person from the cabin in the event of an accident involving the road vehicle.

Optionally in some examples, including in at least one preferred example, the roof assembly further comprises a back deflector, configured to be fixed onto the cabin. In the backward position of the front deflector, the front deflector covers at least partially the back deflector, the back deflector being located between the roof panel and the front deflector. A technical benefit may include improving the aerodynamics properties of the road vehicle on which the roof assembly is mounted.

Optionally in some examples, including in at least one preferred example, the roof assembly further comprises at least one sliding assembly, the front deflector being slidably attached to the back deflector with said at least one sliding assembly and said at least one sliding assembly being configured to guide the front deflector between its forward and backward positions. A technical benefit may include improving the movement of the front deflector between its forward and backward positions and thus avoiding blockages of the front deflector.

Optionally in some examples, including in at least one preferred example, said at least one sliding assembly comprises a rail, the rail having an internal cavity and being fixed to the back deflector, and a slider, the slider projecting from the first deflector, an extremity of the slider being received inside the internal cavity of the rail, the slider being configured to move along the rail when the front deflector is moved between its forward and backward positions for guiding the front deflector between its forward and backward positions. A technical benefit may include providing a reliable and precise guidance of the front deflector relative to the back deflector.

Optionally in some examples, including in at least one preferred example, said at least one sliding assembly further comprises spring-loaded teeth, each spring-loaded tooth being moveable between a closed position, in which said spring-loaded tooth locally closes the internal cavity of the rail, and an open position, in which said spring-loaded tooth does not close the internal cavity, each spring-loaded tooth being spring-loaded towards its closed position, and wherein the slider pushes back the spring-loaded teeth towards their open position when moving along the rail. A technical benefit may include preventing dust and particles to enter the internal cavity, to ensure the movement of the extremity of the slider inside the internal cavity of a sliding assembly is unhindered by dust and particles.

According to a second aspect of the disclosure, the disclosure relates to a road vehicle comprising a roof hatch as describes above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
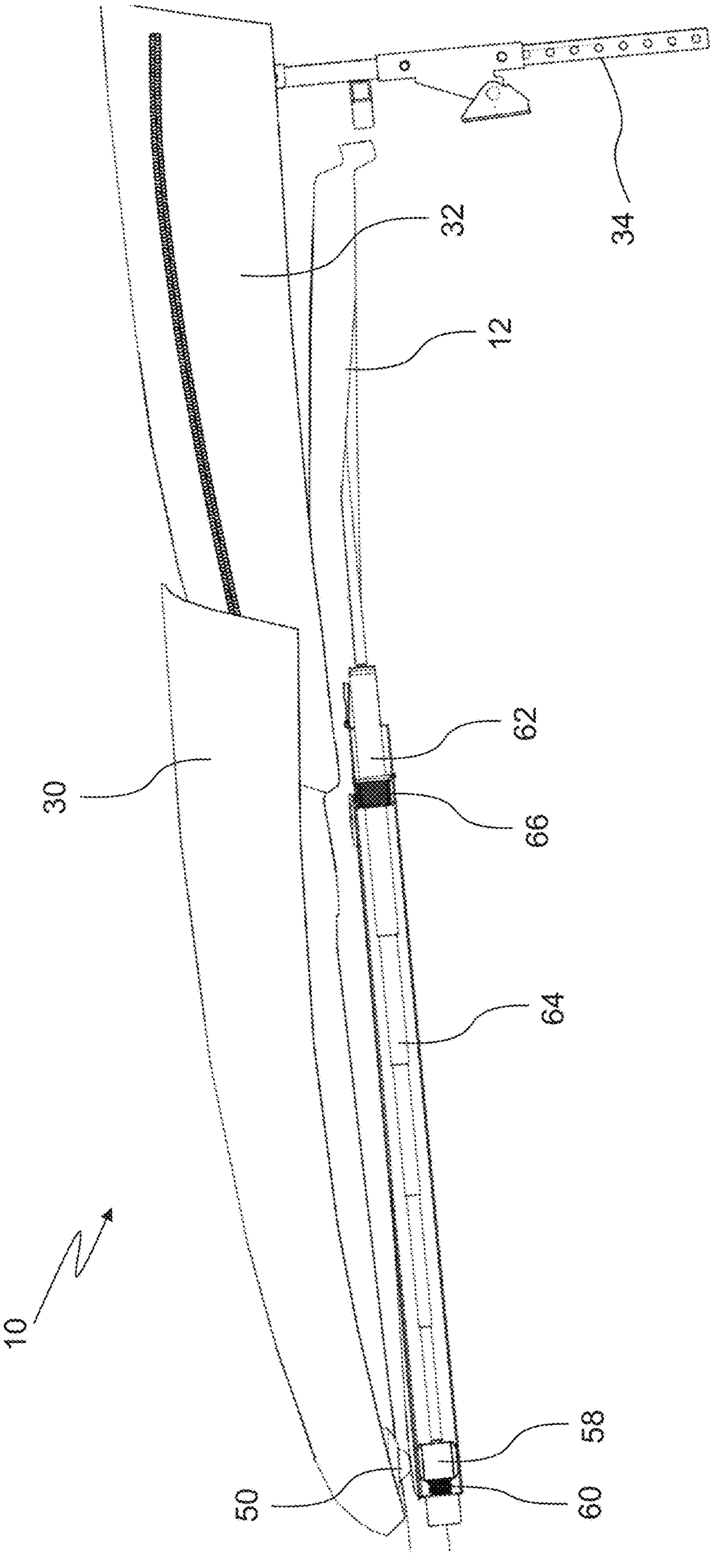
FIG. 1 is a side view of an exemplary roof assembly according to an example, the roof assembly comprising a front deflector and a back deflector, the front deflector being in a forward position.

A roof assembly 10 is shown in FIG. 1. The roof assembly 10 is configured to be mounted onto a road vehicle, not shown. For example, the road vehicle comprises a tractor unit and a semi-trailer attached to the tractor unit, the tractor unit comprising a cabin. The roof assembly 10 comprises a roof panel 12, which covers the cabin of a vehicle.

Figure 2:
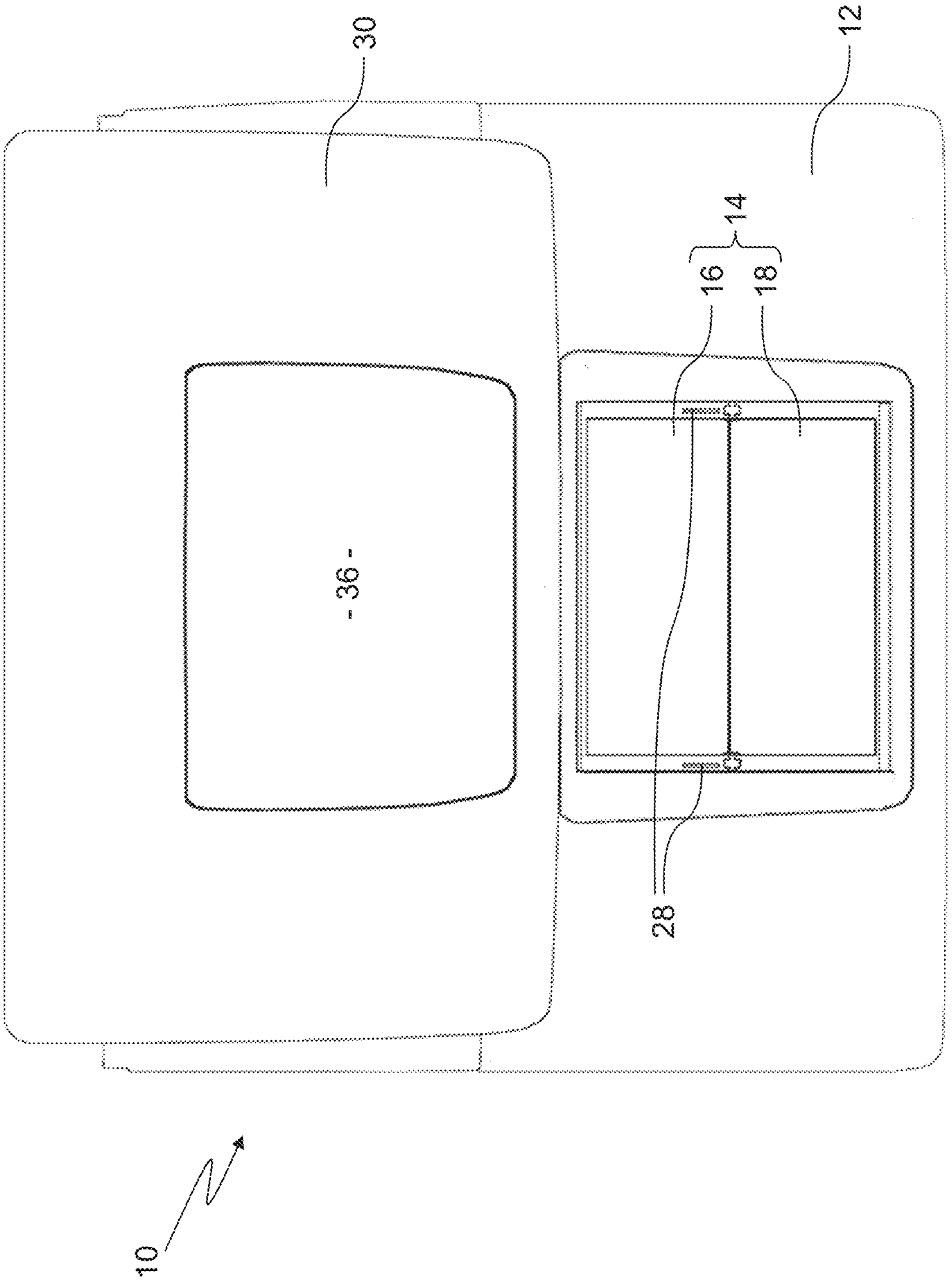
FIG. 2 is a top view of the roof assembly of FIG. 1.

The roof panel 12 comprises a roof hatch 14, more visible on FIGS. 2 and 3. The roof hatch 14 is mounted on the roof panel 12 and openable for allowing a person to go through the roof panel via the opened roof hatch.

In the example, the roof hatch 14 comprises a first panel 16 and a second panel 18, which are mutually hinged through hinges 20. Preferably, the first panel 16 and the second panel 18 comprises transparent panels to allow a person located inside the cabin to see through the roof hatch 14.

In the example, to allow the roof hatch 14 to be opened, the first panel 16 is hinged to the roof panel 12, preferably through a pivot joint 22, the roof assembly 10 comprises two longitudinal rails 24, mounted onto the roof panel 12, and the second panel 18 comprises two rollers 26 which are received into the two longitudinal rails of the roof panel. Hence, when the rollers 26 moves inside the longitudinal rails 24 towards the pivot joint 22, the roof hatch foldably opens.

Figure 3A:
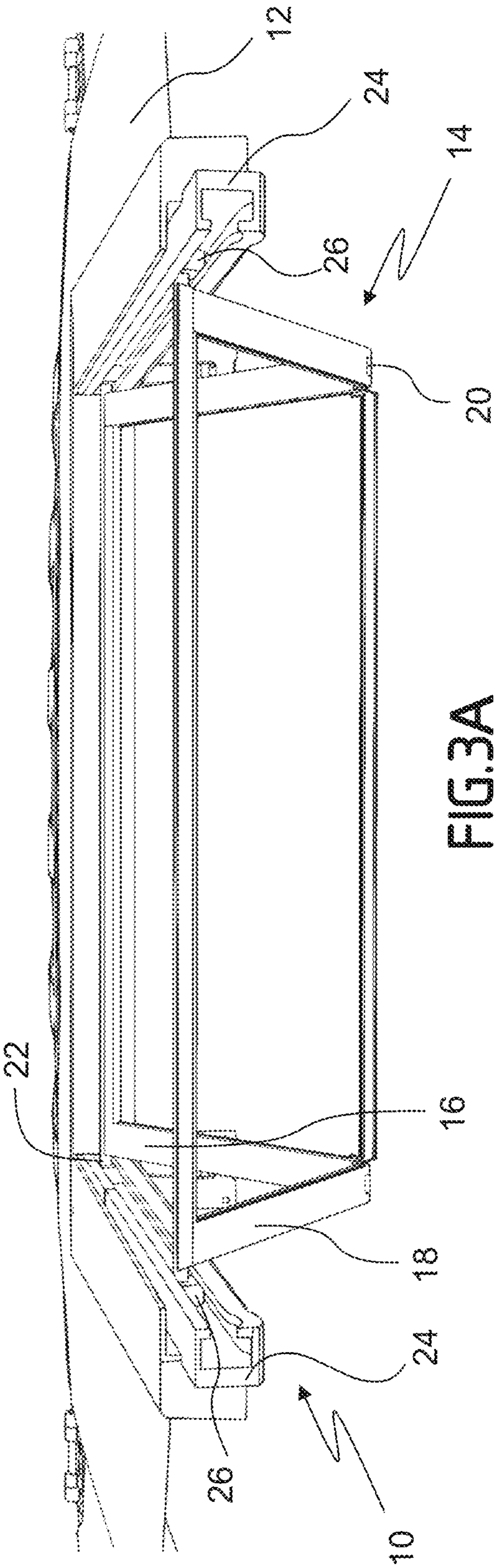
FIGS. 3A-3B show two perspective views of the roof assembly of FIGS. 1 and 2, in which a roof hatch of the roof assembly is opened in two different ways and in which the front deflector and the back deflector of the roof assembly are hidden.
Figure 3B:
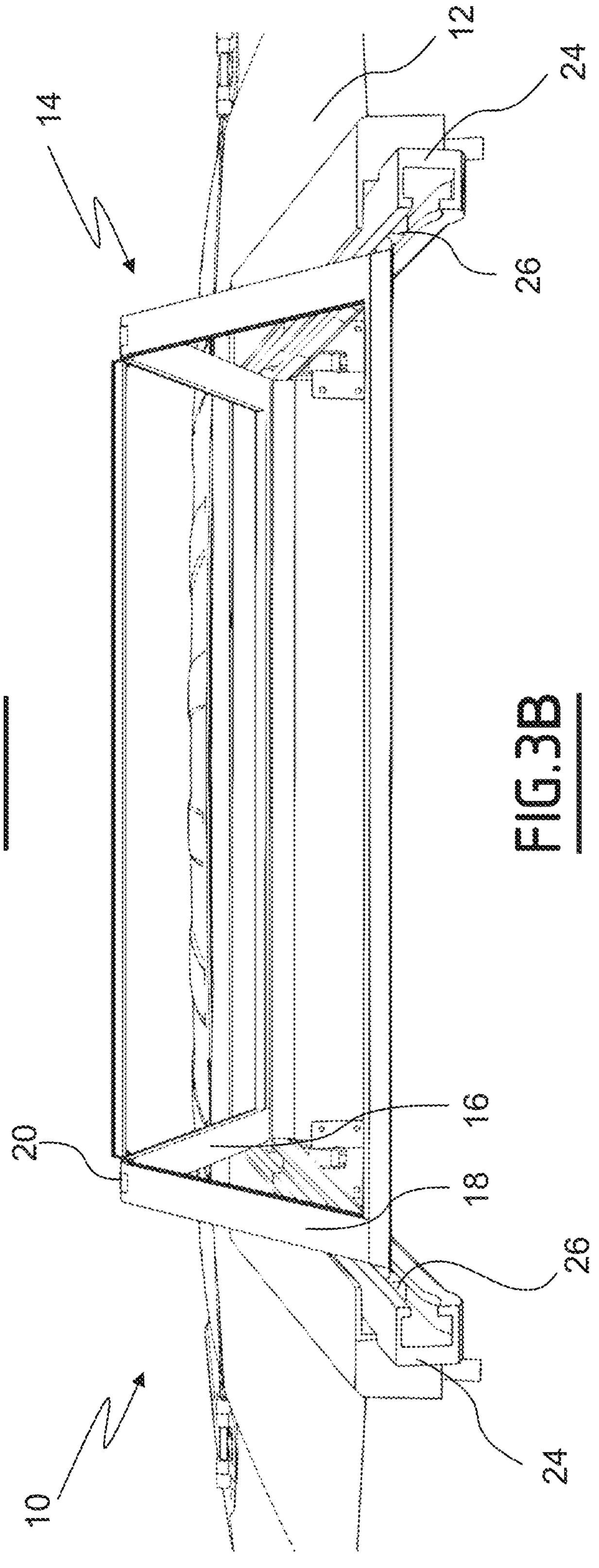

Advantageously, the roof hatch 14 is openable towards the inside of the cabin, as shown in FIG. 3A, and towards the outside of the cabin, as shown in FIG. 3B. Therefore, the roof hatch 14 can easily be opened from the outside, or from the inside, of the cabin, that is of the vehicle.

Preferably, to facilitate the opening of the roof hatch 14, the roof hatch comprises handles 28. The handles 28 are only shown in FIG. 2.

To improve the aerodynamics properties of the vehicle, the roof assembly 10 comprises a front deflector 30, and a back deflector 32.

The front deflector 30 and the back deflector 32 are located on the outside of the roof of the cabin of the road vehicle to redirect wind impacting the cabin roof to the semi-trailer roof.

The back deflector 32 is fixed onto the cabin of the vehicle. In the example, the back deflector 32 is fixed onto cabin through brackets 34, preferably two brackets 34. Preferably, the brackets 34 are fixed to a back wall, not shown, of the cabin.

The front deflector 30 is slidably moveable between a forward position, in which the front deflector covers the roof hatch 14, and a backward position, in which the front deflector does not cover the roof hatch and covers at least partially the back deflector 32 and in which the back deflector is located between the roof panel 12 and the front deflector 30.

Preferably, the front deflector 30 comprises a transparent panel 36. Therefore, when the front deflector 30 is in its forward position, a person located inside the cabin can see the exterior of the cabin through the roof hatch 14 and the front deflector 30.

Preferably, the roof assembly 10 comprises at least one sliding assembly 32, in the example two sliding assemblies 38, to slidably attach the front deflector 30 to the back deflector 32. The sliding assemblies 38 guide the front deflector 30 between its forward and backward positions.

Figure 4:
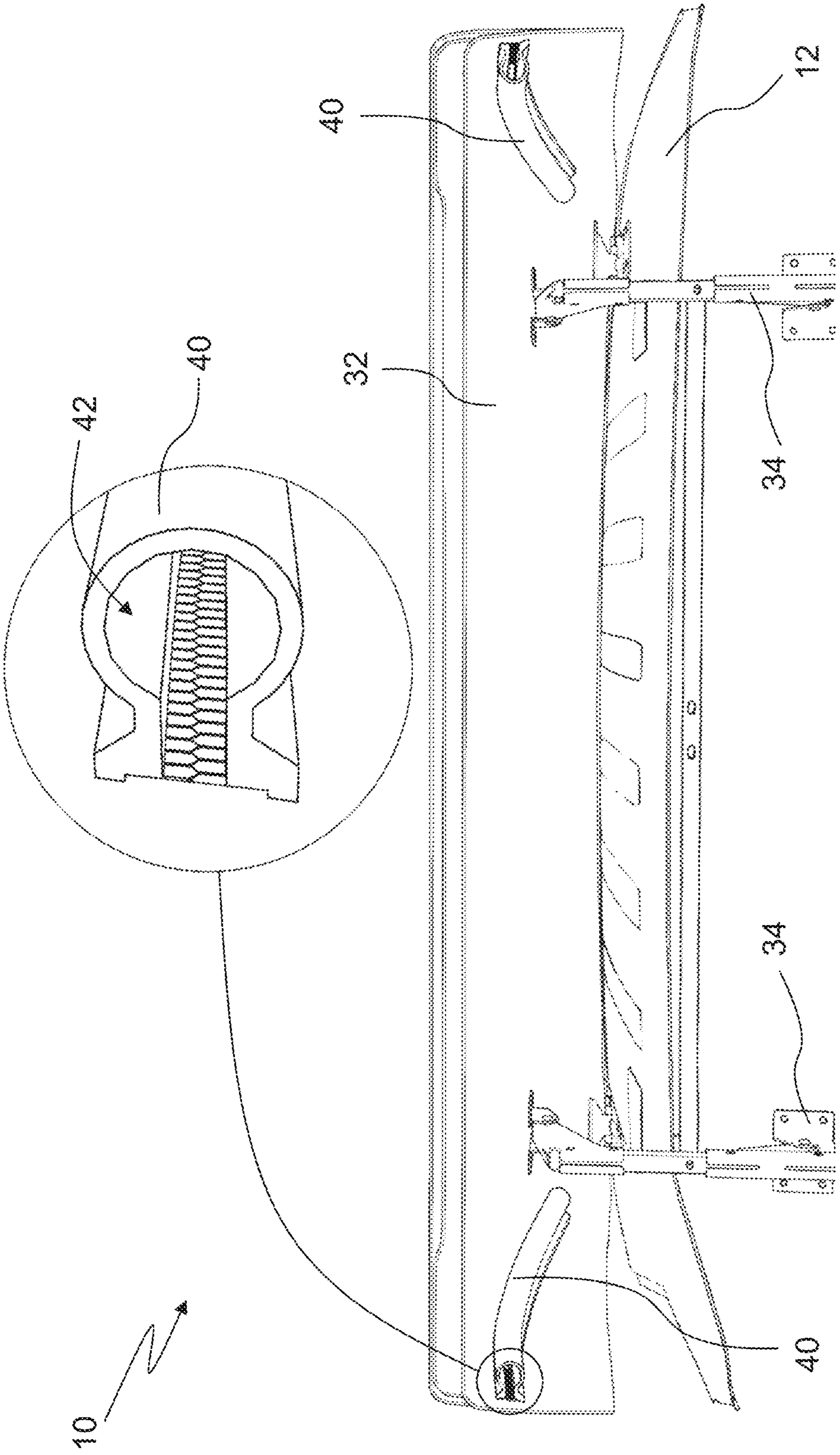
FIG. 4 is a front view of the roof assembly of FIGS. 1 to 3, in which the front deflector and the roof hatch are hidden.
Figure 5:
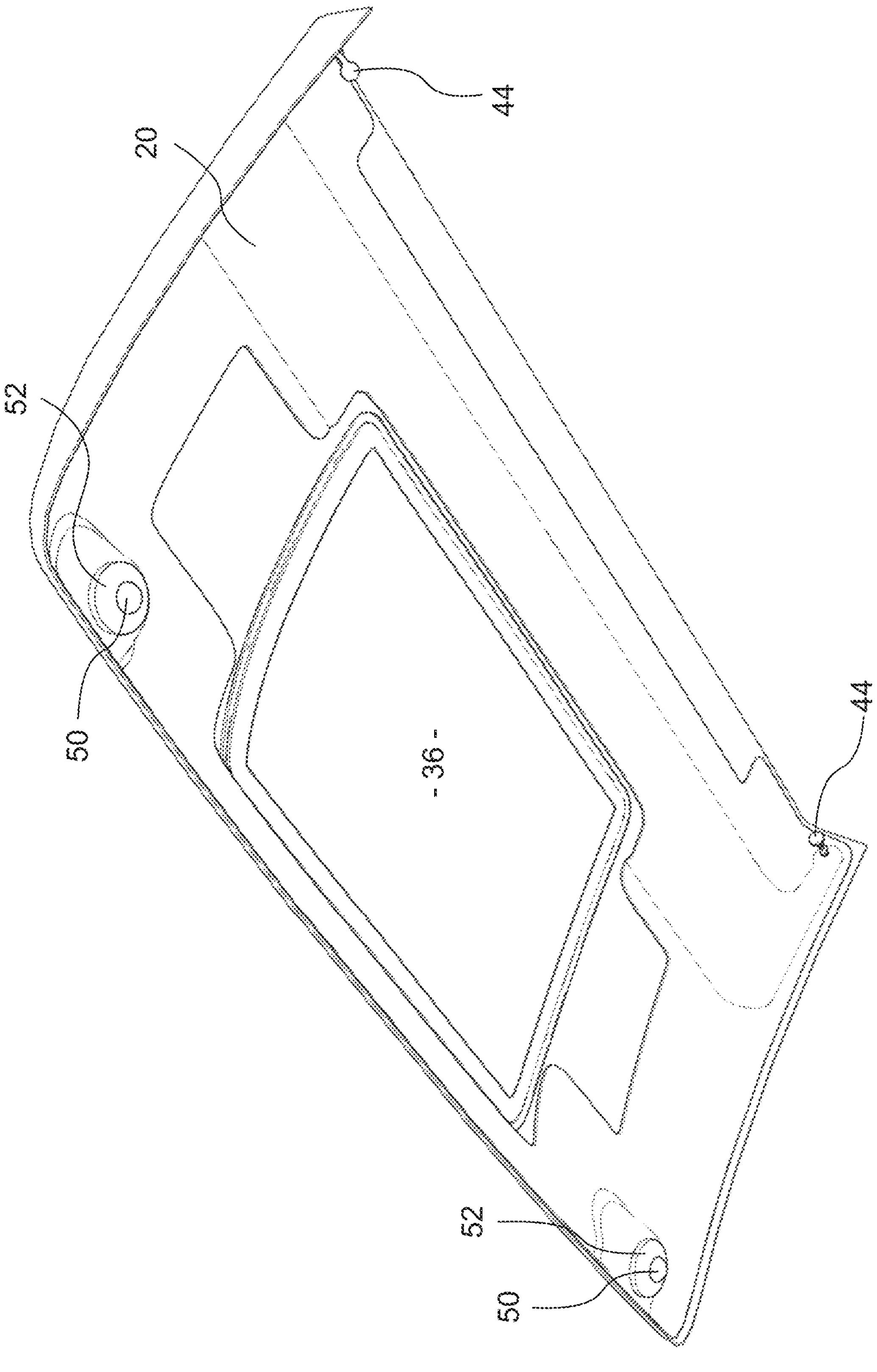
FIG. 5 is a perspective view of the front deflector of the roof assembly of FIGS. 1 to 4.
Figure 6B:
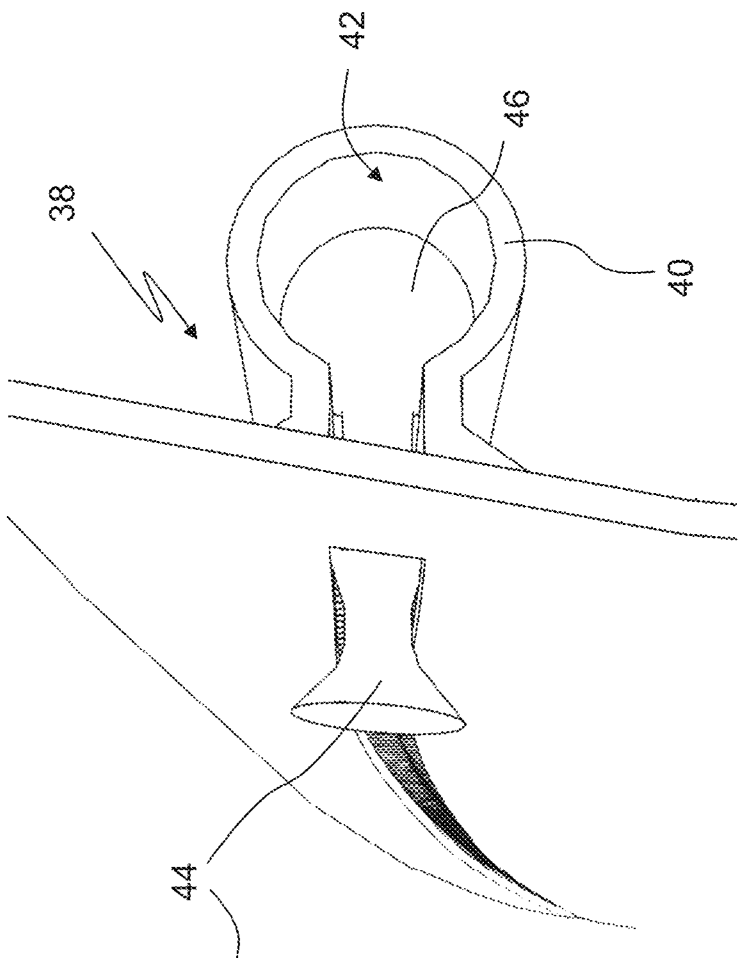
FIGS. 6A-6B show two perspective views of a sliding assembly of the roof assembly of FIGS. 1 to 5.
Figure 6A:
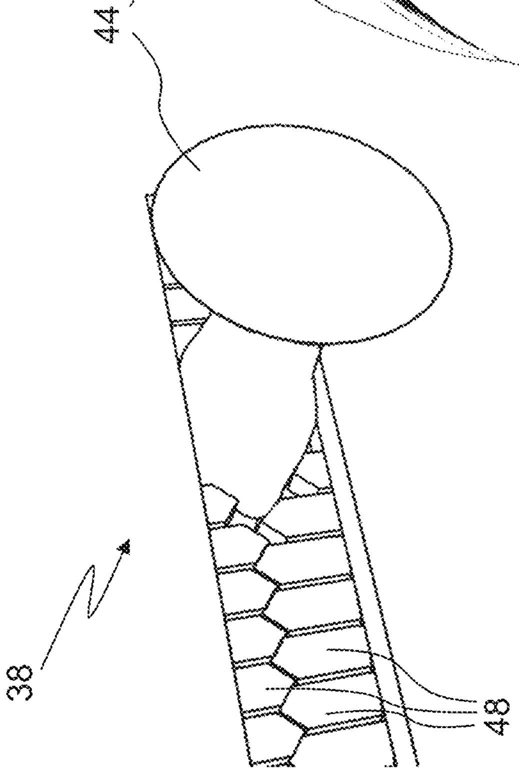

In the example, each of the two sliding assemblies 38, which are more visible on FIGS. 4 to 6, comprises a rail 40. The rail 40 of each sliding assembly 38 is fixed to the back deflector 32 and comprises an internal cavity 42. Preferably, the two rails 40 are fixed on two opposite sides of the back deflector 32. Furthermore, each of the two sliding assemblies 38 comprises a slider 44. The slider 44 of each sliding assembly 38 projects from the front deflector 30 and an extremity 46 of the slider 44 of each sliding assembly 38 is received inside the internal cavity 42 of the rail 40 of the sliding assembly, as visible in FIG. 6B. In this manner, the extremity 46 of each slider 44 positions the slider relative to the corresponding rail 40. Therefore, the slider 44 of each sliding assembly 38 moves along the rail 40 of the corresponding sliding assembly when the front deflector 30 is moved between its forward and backward positions, for guiding the front deflector between its forward and backward positions.

Preferably, each sliding assembly 38 further comprises spring-loaded teeth 48, each spring-loaded tooth being moveable between a closed position, in which said spring-loaded tooth locally closes the internal cavity 42 of the corresponding rail 40, and an open position, in which said spring-loaded tooth does not close the internal cavity, each spring-loaded tooth being spring-loaded towards its closed position. In other word, the spring-loaded teeth 48 close together the internal cavity 42 of the corresponding rail 40, thus preventing dust and particles to enter the internal cavity. Therefore, the movement of the extremity 46 of the slider 44 inside the internal cavity 42 of a sliding assembly 38 is unhindered by dust and particles. Furthermore, as visible in FIG. 6A, the slider 44 pushes back the spring-loaded teeth 48 towards their open position when moving along the rail. In other words, around the slider 44 of a sliding assembly 38, the spring-loaded teeth 48 are pushed in their open position to allow the slider 44 to extend from the front deflector 30 inside the internal cavity 42. Hence, the spring-loaded teeth 48 keep clean the internal cavity without stopping the slider 44 to be guided into the internal cavity 42 of the corresponding rail 40.

To further guide the front deflector 30 between its forward and backward positions, the front deflector comprises at least one roller 50, in the example two rollers 50. Each of the two rollers 50 rolls over the roof panel 12 when the front deflector 30 moves between its forward and backward positions. Thus, the rollers 50 guide the front deflector between its forward and backward positions.

The front deflector 30 also comprises at least one magnetic part 52, in the example two magnetic parts 52, which are located in proximity to the two rollers 52. Furthermore, in the example, the two magnetic parts 52 each comprise a magnetic ring, the magnetic ring of each magnetic part 52 surrounding one of the two rollers 50. Preferably, the magnetic parts 52 are made in ferromagnetic material, for example in ferromagnetic iron alloy.

To move the front deflector 30 between its forward and backward positions and to lock the front deflector in said forward and backward positions, the roof assembly 10 comprises at least one locking assembly 54, in the example two locking assemblies 54. One of the two locking assemblies 54 is visible in FIGS. 1, 7 and 8.

Each locking assembly 54 comprises a housing 56, which extends longitudinally. The housing 56 of the two locking assemblies 54 extend parallel to each other.

Figure 7:
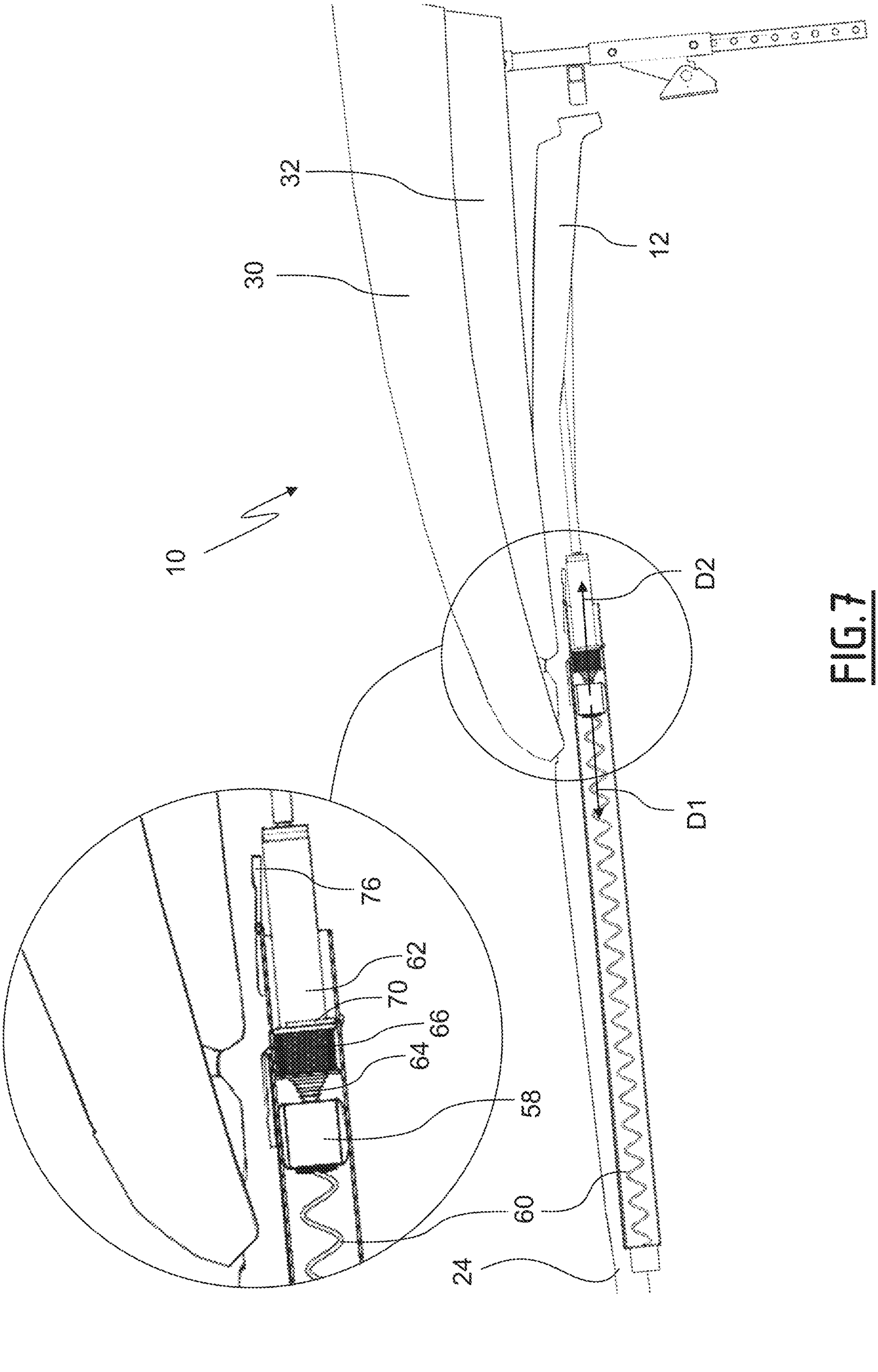
FIG. 7 is a side view similar to FIG. 1, in which the front deflector is in a backward position.
Figure 8:
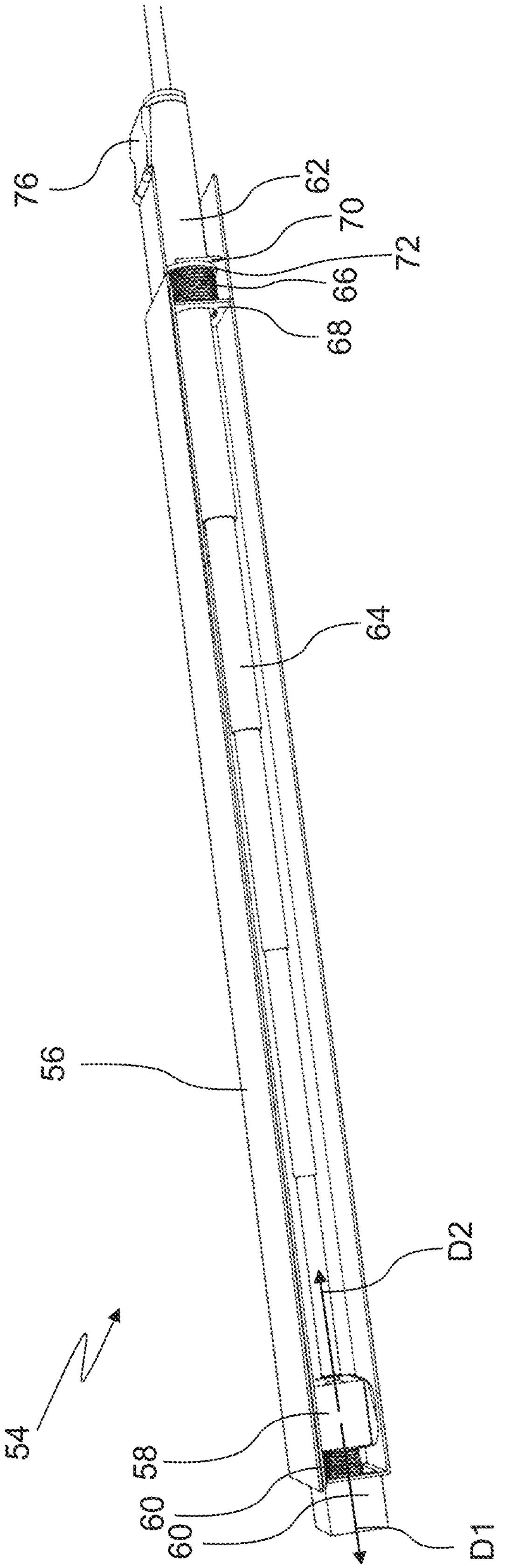
FIG. 8 is a perspective view of a locking assembly of the roof assembly of FIGS. 1 to 7.

Each locking assembly 54 comprises a magnetic connector 58, which is preferably a magnet and which is located inside the housing 56. The magnetic connector 58 is moveable relative to the housing 56 along a forward direction D1, between a backward position and a forward position, and along a backward direction D2 opposed to the forward direction D1, between its forward position and its backward position. The forward position is located in the forward direction relative to the backward position. In FIGS. 1 and 8, the magnetic connector 58 of the visible locking assembly 54 is shown in its forward position. In FIG. 7, the magnetic connector 58 of the visible locking assembly 54 is shown in its backward position.

The magnetic connector 58 of each locking assembly 54 is configured to be magnetically coupled with one of the magnetic parts 52 of the front deflector 30, so that the front deflector 32 is in its forward position when the magnetic connectors of both of the locking assemblies 54 are in their forward position and so that the front deflector is in its backward position when the magnetic connectors of both of the locking assemblies 54 are in their backward position. Hence, to ensure a good operation of the front deflector 30, the magnetic connectors 58 of both of the locking assemblies 54 are always in the same position.

Each locking assembly 54 comprises a first spring 60 exerting a force on the magnetic connector 58 relative to the housing 56 along the backward direction D2, said force tending to move the magnetic connector 58 in the backward direction towards its backward position. Hence, in the backward position of the magnetic connector 58, the first spring 60 is extended and in the forward position of the magnetic connector 58, the first spring 60 is compressed.

Each locking assembly 54 comprises an actuator 62, located at least partially inside the housing 56, configured to exert a force on the magnetic connector 58 relative to the housing along the forward direction D1 for moving the magnetic connector in the forward direction against the force exerted by the first spring 60. The actuator 62 of each locking assembly 54 is actuable to drive the magnetic connector 58 of the corresponding locking assembly 54 between its forward and backward positions.

In the example, the actuator 62 of each locking assembly 54 is a pneumatic cylinder, comprising a piston 64 extending in the housing 56, the force exerted by the pneumatic cylinder 64 on the magnetic connector 58 being exerted by the piston. Preferably, the pneumatic cylinder is a telescopic pneumatic cylinder. Hence, the course of the piston 64 is increased, allowing greater amplitude of movement of the magnetic connector 58 and therefore of the front deflector 30.

The pneumatic cylinder 62 of each locking assembly 54 is configured so that when the pneumatic cylinder is pressurized, the piston 64 moves along the forward direction D1 and pushes the magnetic connector 58 along the forward direction, against the force exerted by the first spring 60, until the magnetic connector 58 is in its forward position. Furthermore, when the pneumatic cylinder 62 is depressurized, the piston 64 moves along the backward direction D2 and therefore does not push the magnetic connector 58, which then moves along the backward direction D2 under the force exerted by the first spring 60.

Preferably, the pneumatic cylinder 62 is pressurized by a pneumatic circuit of the road vehicle, not shown, or by a dedicated pump.

Thanks to the locking assemblies 54, a person located inside the cabin of the road vehicle can command the front deflector 30 to move from its forward position towards its backward position, by actuating the pneumatic cylinders 62, more precisely by depressurizing the pneumatic cylinders so as to move the magnetic connectors 58 from their forward position towards their backward position. After that, the person can open the roof hatch 14, for example to ventilate the cabin when the road vehicle is at a stop or moving at slow speed. In such use case, the roof hatch 14 is preferably open towards the outside of the cabin, as shown in FIG. 3B.

Advantageously, this opening of the roof hatch 14 is non-destructive and can therefore be performed without needing the replacement of components of the roof assembly 10.

Furthermore, the locking assemblies 54 are particularly simple to build, because they comprise a limited number of parts and no complex parts. Hence, they are not expensive to build and more reliable.

Advantageously, the roof assembly 10 is also configured to automatically move the front deflector 30 from its forward position towards its backward position in case of an emergency, for example in case of an accident involving the road vehicle.

To this end, each locking assembly 54 further comprises a second spring 66 exerting a force on the corresponding pneumatic cylinder 62 relative to the housing 56 along the backward direction D2, said force tending to move the actuator in the backward direction D2. Preferably, the housing 56 comprises a hollowed stopper 68, more visible in FIG. 8, on which the second spring 66 bears, and through which the piston 64 extends. Hence, the second spring 66 is located between the stopper 68 and the pneumatic cylinder 62. Furthermore, the piston 64 extends inside of the second spring 66, without touching the second spring.

Figure 9:
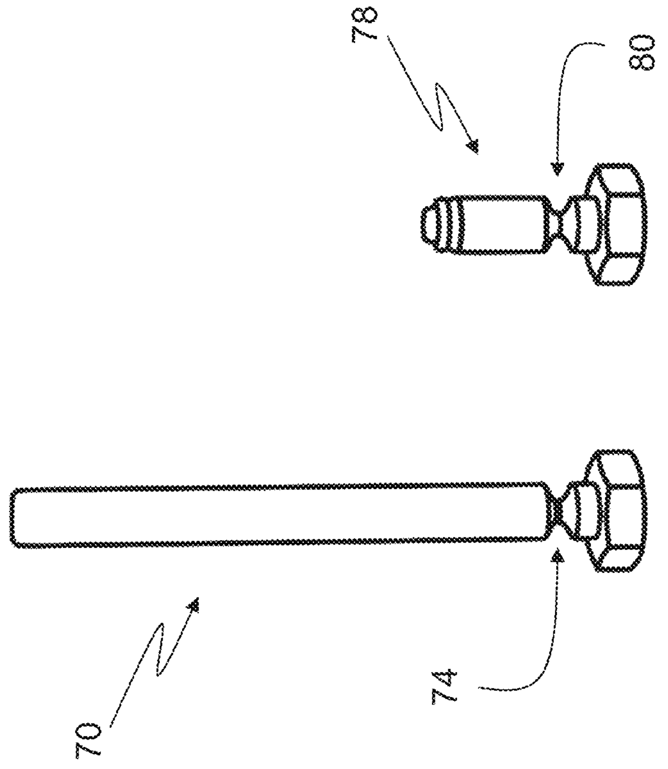
FIG. 9 is a perspective view of two stopper shearing bolt and a cylinder shearing bolt belonging to the locking assembly of the roof assembly of FIGS. 1 to 8.

To prevent the pneumatic cylinder 62 from being moved along the backward direction D2 by the force exerted by the second spring 66, each locking assembly 54 further comprises at least one stopper shearing bolt 70, preferably two stopper shearing bolts. A stopper shearing bolt is shown in FIG. 9. Each stopper shearing bolt 70 of each locking assembly 54 extends through the corresponding housing 56. Furthermore, the pneumatic cylinder 62 of each locking assembly 54 comprises a shoulder 72. Under the force exerted by the second spring 66 of each locking assembly 54, the shoulder 72 of the corresponding pneumatic cylinder

62 comes in abutment against the corresponding stopper shearing bolt 70, thus preventing the pneumatic cylinder 62 from being moved along the backward direction D2.

Furthermore, the stopper shearing bolts 70 of the locking assemblies 54 are configured to break when the cabin of the road vehicle is subjected to a deceleration above a predetermined deceleration value. The predetermined deceleration value is preferably greater than or equal to 2G. Preferably, to this end, each stopper shearing bolt 70 comprises a shear area 74, which has a reduced amount of material, dimensioned to break when the cabin of the road vehicle is subjected to a deceleration greater than the predetermined deceleration value, due to the shearing forces exerted on the stopper shearing bolt 70 by its inertia, the pneumatic cylinder 62 and the housing 56 and caused by the deceleration.

Hence, during an important deceleration of the cabin of the road vehicle, generally corresponding to an accident of the road vehicle, the stopper shearing bolts 70 break and thereby release the movement of the pneumatic cylinders 62 of the locking assemblies 54 along the backward direction D2 under the effect of the force exerted by the second springs 66. Then, the pneumatic cylinders 62 are ejected outside of the housings 56 of the locking assemblies 54 and are no longer exerting a force against the respective magnetic connectors 58. Therefore, once the stopper shearing bolts 70 are broken, the magnetic connectors 58 are moved towards their backward positions under the effect of the force exerted by the respective first springs 60.

Advantageously, to prevent a reentry of the pneumatic cylinders 62 into the respective housings 56, each locking assembly 54 comprises a hinged door 76, connected to the end of the housing 56 in the backward direction D2 through which the corresponding pneumatic cylinder 62 enters the housing.

The hinged door 76 of each locking assembly 54 is moveable between an open configuration, visible on FIGS. 1, 7 and 8, in which the hinged door does not close the end of the housing 56 in the backward direction D2, and a closed configuration, not shown in the figures, in which the hinged door closes said end of the housing. The hinged door 76 is configured to move from its open configuration towards its closed configuration when the corresponding pneumatic cylinder 62 exit the corresponding housing 56 under the effect of the force exerted by the corresponding second spring 66 and to prevent said pneumatic cylinder from moving back into said housing. In other words, after the stopper shearing bolts 70 break, the pneumatic cylinders 62 are ejected outside of the corresponding housings 56 by the corresponding second springs 66 and are prevented from moving back into the housings by the hinged doors 76.

To eject more reliably the pneumatic cylinders 62 outside of the housings 56 of the locking assemblies 54 in case of an accident of the road vehicle, each locking assembly advantageously comprises a cylinder shearing bolt 78. Each cylinder shearing bolt 78 seals an opening in one of the pneumatic cylinders 62, the cylinder shearing bolt 78 being configured to break when the cabin of the road vehicle is subjected to a deceleration above the predetermined deceleration value. Preferably, to this end, each cylinder shearing bolt 78 comprises a shear area 80, which has a reduced amount of material, dimensioned to break when the cabin of the road vehicle is subjected to a deceleration greater than the predetermined deceleration value, due to the shearing forces exerted on the cylinder shearing bolt 78 by its inertia and the pneumatic cylinder 62 and caused by the deceleration.

Once the cylinder shearing bolt 78 mounted onto the opening of a pneumatic cylinder 62 breaks, the opening is thereby freed. Due to this freeing of the opening, the pneumatic cylinder 62 can no longer be pressurized and is depressurized if it was previously pressurized. In other words, the breaking of the cylinder shearing bolts 78 lead to the depressurization of the pneumatic cylinders 62. Therefore, the piston 64 moves along the backward direction D2 and therefore does not push the magnetic connector 58, which then moves along the backward direction D2 under the force exerted by the first spring 60.

It is to be understood that the pneumatic cylinders 62 can only drive the magnetic connectors 58 in their forward position when the cylinder shearing bolts 78 seal the openings in the pneumatic cylinder.

After a deceleration of the cabin of the road vehicle equal or greater to the predetermined deceleration value, the depressurization of the pneumatic cylinders 62, combined with the ejection of the pneumatic cylinder 62 under the force exerted by the second springs 66, ensure rapid disengagement of the pistons 64 from the magnetic connectors 58 and, therefore, a rapid movement of the magnetic connectors 58 from their forward positions towards their backward positions under the force exerted by the first springs 60. Hence, in case of an accident of the road vehicle, the front deflector 30 is rapidly moved from its forward position towards its backward position. The roof panel 12 can then be easily opened, either from the inside of the cabin, allowing a person located inside of the cabin to exit the cabin, or from the outside of the cabin, allowing rescuers to provide assistance to a person in the cabin.

Furthermore, this automatic movement of the front deflector 30 towards its backward position in case of an accident of the road vehicle is particularly reliable, as it is only caused by the shearing of the shearing bolts 70 and 78 and therefore does not rely on energy sources which may be damaged in case of an accident.

In addition, this automatic movement of the front deflector 30 towards its backward position in case of an accident of the road vehicle is particularly fast, because the pneumatic cylinders 62 and the magnetic connectors 58 are spring-loaded.

Advantageously, after this automatic movement of the front deflector 30 towards its backward position in case of an accident of the road vehicle, the roof assembly 10 can be reinstalled in its original configuration cheaply, as only the shearing bolts 70 and 78 need to be replaced.

In a variant, not shown, the roof assembly 10 does not comprise a back deflector. Therefore, the front deflector 30 is slidably attached to the roof panel 12.

Example 1: A roof assembly 10 for a road vehicle, the road vehicle comprising a cabin, the roof assembly 10 comprising:

- a roof panel 12, configured to cover the cabin,
- a roof hatch 14, mounted on the roof panel 12 and openable for allowing a person to go through the roof panel 12 via the opened roof hatch 14,
- a front deflector 30, configured to be slidably moveable between a forward position, in which the front deflector 30 covers the roof hatch 14, and a backward position, in which the front deflector 30 does not cover the roof hatch 14, the front deflector 30 comprising at least one magnetic part 52, and
- at least one locking assembly 54, said at least one locking assembly 54 being configured to move the front deflector 30 between its forward and backward positions and to lock the front deflector 30 in said forward and backward positions, said at least one locking assembly 54 comprising:

a housing 56, a magnetic connector 58, located inside the housing 56, wherein the magnetic connector 58 is moveable relative to the housing 56 along a forward direction D1, between a backward position and a forward position, the forward position being in the forward direction D1 relative to the backward position, wherein the magnetic connector 58 is configured to be magnetically coupled with one of the at least one magnetic part 52 of the front deflector 30 so that the front deflector 30 is in its forward position when the magnetic connector 58 is in its forward position and so that the front deflector 30 is in its backward position when the magnetic connector 58 is in its backward position, a first spring 60, exerting a force on the magnetic connector 58 relative to the housing 56 along a backward direction D2 opposed to the forward direction D1, said force tending to move the magnetic connector 58 in the backward direction D2 towards its backward position, and an actuator 62, located at least partially inside the housing 56, configured to exert a force on the magnetic connector 58 relative to the housing 56 along the forward direction D1 for moving the magnetic connector 58 in the forward direction D1 against the force exerted by the first spring 60, and configured to be actuated so as to drive the magnetic connector 58 between its forward and backward positions.

Example 2: The roof assembly 10 of example 1, wherein said at least one locking assembly 54 further comprises:

a second spring 66, exerting a force on the actuator 62 relative to the housing 56 along the backward direction D2, said force tending to move the actuator 62 in the backward direction D2, and at least one stopper shearing bolt 70, preventing the actuator 62 from being moved along the backward direction D2 by the force exerted by the second spring 66, wherein the at least one stopper shearing bolt 70 is configured to break when the cabin of the road vehicle is subjected to a deceleration above a predetermined deceleration value and thereby release the movement of the actuator 62 along the backward direction D2 under the effect of the force exerted by the second spring.

Example 3: The roof assembly 10 of example 2, wherein the actuator 62 is a pneumatic cylinder 62, wherein:

the locking assembly 54 comprises a cylinder shearing bolt 78, the cylinder shearing bolt sealing an opening in the pneumatic cylinder 62, the cylinder shearing bolt being configured to break when the cabin of the road vehicle is subjected to a deceleration above the predetermined deceleration value, and thereby free the opening in the pneumatic cylinder 62, and the pneumatic cylinder 62 is configured to drive the magnetic connector 58 in its forward position when the cylinder shearing bolt 78 seals the opening and the pneumatic cylinder 62 is pressurized, the pneumatic cylinder 62 being depressurized when the opening is freed by the breaking of the cylinder shearing bolt 78.

Example 4: The roof assembly 10 of example 3, wherein the pneumatic cylinder 62 comprises a piston 64, the force exerted by the pneumatic cylinder 62 on the magnetic connector 58 being exerted by the piston 64, the piston 64 extending in the housing 56.

Example 5: The roof assembly 10 of any one of examples 3 to 4, wherein the pneumatic cylinder 62 is a telescopic pneumatic cylinder 62.

Example 6: The roof assembly 10 of any one of examples 2 to 5, wherein the locking assembly 54 further comprises a hinged door 76, connected to one end of the housing 56 in the backward direction D2 the hinged door 76 being moveable between an open configuration in which the hinged door does not close said end of the housing 56 and a closed configuration in which the hinged door closes said end of the housing 56, wherein the hinged door 76 is configured to move from its open configuration towards its closed configuration when the actuator 62 exit the housing 56 under the effect of the force exerted by the second spring 66 and to prevent the actuator 62 from moving back into the housing 56.

Example 7: The roof assembly 10 of any one of examples 2 to 6, wherein the predetermined deceleration value is greater than or equal to 2G.

Example 8: The roof assembly 10 of any one of examples 1 to 7, wherein the front deflector 30 comprises at least one roller 50 configured to roll over the roof panel 12 when the front deflector 30 moves between its forward and backward positions for guiding the front deflector 30 between its forward and backward positions and wherein the at least one magnetic part 52 of the front deflector 30 comprises a magnetic ring 52 surrounding said at least one roller 50.

Example 9: The roof assembly 10 of any one of examples 1 to 8, wherein the roof hatch 14 comprises two panels 16, 18, mutually hinged, and wherein the roof hatch 14 is configured to be open foldably.

Example 10: The roof assembly 10 of example 9, wherein the roof panel 12 comprises two longitudinal rails 24, wherein a first panel 16 of the roof hatch 14 is hinged to the roof panel 12, wherein a second panel 18 of the roof hatch 14 comprises two rollers 26 and wherein the two rollers 26 of the second panel 18 are received into the two longitudinal rails 24 of the roof panel 12.

Example 11: The roof assembly 10 of any one of examples 1 to 10, further comprising a back deflector 32, configured to be fixed onto the cabin, and wherein, in the backward position of the front deflector 30, the front deflector 30 covers at least partially the back deflector 32, the back deflector 32 being located between the roof panel 12 and the front deflector 30.

Example 12: The roof assembly 10 of example 11, wherein the roof assembly 10 further comprises at least one sliding assembly 38, wherein the front deflector 30 is slidably attached to the back deflector 32 with said at least one sliding assembly 38 and wherein said at least one sliding assembly 38 is configured to guide the front deflector 30 between its forward and backward positions.

Example 13: The roof assembly 10 of example 12, wherein said at least one sliding assembly 38 comprises:

a rail 40, the rail having an internal cavity 42 and being fixed to the back deflector 32, and a slider 44, the slider projecting from the first deflector 30, an extremity of the slider 44 being received inside the internal cavity 42 of the rail 40, the slider 44 being configured to move along the rail 40 when the front deflector 30 is moved between its forward and backward positions for guiding the front deflector 30 between its forward and backward positions.

Example 14: The roof assembly 10 of example 13, wherein said at least one sliding assembly 38 further comprises spring-loaded teeth 48, each spring-loaded tooth 48 being moveable between a closed position, in which said spring-loaded tooth 48 locally closes the internal cavity 42 of the rail 40, and an open position, in which said spring-loaded tooth 48 does not close the internal cavity 42, each spring-loaded tooth 48 being spring-loaded towards its closed position, and wherein the slider 44 pushes back the spring-loaded teeth 48 towards their open position when moving along the rail 40.

Example 15: A road vehicle comprising the device according to any one of examples 1 to 14.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A roof assembly for a road vehicle, the road vehicle comprising a cabin, the roof assembly comprising:

a roof panel, configured to cover the cabin;

a roof hatch, mounted on the roof panel and openable for allowing a person to go through the roof panel via the opened roof hatch;

a front deflector, configured to be slidably moveable between a forward position, in which the front deflector covers the roof hatch, and a backward position, in which the front deflector does not cover the roof hatch, the front deflector comprising at least one magnetic part; and at least one locking assembly, the at least one locking assembly being configured to move the front deflector between its forward and backward positions and to lock the front deflector in the forward and backward positions, the at least one locking assembly comprising:

a housing;

a magnetic connector, located inside the housing, wherein the magnetic connector is moveable relative to the housing along a forward direction, between a backward position and a forward position, the forward position being in the forward direction relative to the backward position, wherein the magnetic connector is configured to be magnetically coupled with one of the at least one magnetic part of the front deflector so that the front deflector is in its forward position when the magnetic connector is in its forward position and so that the front deflector is in its backward position when the magnetic connector is in its backward position;

a first spring, exerting a force on the magnetic connector relative to the housing along a backward direction opposed to the forward direction, the force tending to move the magnetic connector in the backward direction towards its backward position; and an actuator, located at least partially inside the housing, configured to exert a force on the magnetic connector relative to the housing along the forward direction for moving the magnetic connector in the forward direction against the force exerted by the first spring, and configured to be actuated so as to drive the magnetic connector between its forward and backward positions.

2. The roof assembly of claim 1, wherein the at least one locking assembly further comprises:

a second spring, exerting a force on the actuator relative to the housing along the backward direction, the force tending to move the actuator in the backward direction; and at least one stopper shearing bolt, preventing the actuator from being moved along the backward direction by the force exerted by the second spring, wherein the at least one stopper shearing bolt is configured to break when the cabin of the road vehicle is subjected to a deceleration above a predetermined deceleration value and thereby release the movement of the actuator along the backward direction under the effect of the force exerted by the second spring.

3. The roof assembly of claim 2, wherein the actuator is a pneumatic cylinder, wherein:

the locking assembly comprises a cylinder shearing bolt, the cylinder shearing bolt sealing an opening in the pneumatic cylinder, the cylinder shearing bolt being configured to break when the cabin of the road vehicle is subjected to a deceleration above the predetermined deceleration value, and thereby free the opening in the pneumatic cylinder; and the pneumatic cylinder is configured to drive the magnetic connector in its forward position when the cylinder shearing bolt seals the opening and the pneumatic cylinder is pressurized, the pneumatic cylinder being depressurized when the opening is freed by the breaking of the cylinder shearing bolt.

4. The roof assembly of claim 3, wherein the pneumatic cylinder comprises a piston, the force exerted by the pneumatic cylinder on the magnetic connector being exerted by the piston, the piston extending in the housing.

5. The roof assembly of claim 3, wherein the pneumatic cylinder is a telescopic pneumatic cylinder.

6. The roof assembly of claim 2, wherein the locking assembly further comprises a hinged door, connected to one end of the housing in the backward direction, the hinged door being moveable between an open configuration in which the hinged door does not close the end of the housing and a closed configuration in which the hinged door closes the end of the housing, wherein the hinged door is configured to move from its open configuration towards its closed configuration when the actuator exits the housing under the effect of the force exerted by the second spring and to prevent the actuator from moving back into the housing.

7. The roof assembly of claim 2, wherein the predetermined deceleration value is greater than or equal to 2G.

8. The roof assembly of claim 1, wherein the front deflector comprises at least one roller configured to roll over the roof panel when the front deflector moves between its forward and backward positions for guiding the front deflector between its forward and backward positions and wherein the at least one magnetic part of the front deflector comprises a magnetic ring surrounding the at least one roller.

9. The roof assembly of claim 1, wherein the roof hatch comprises two panels, mutually hinged, and wherein the roof hatch is configured to be opened foldably.

10. The roof assembly of claim 9, wherein the roof panel comprises two longitudinal rails, wherein a first panel of the roof hatch is hinged to the roof panel, wherein a second panel of the roof hatch comprises two rollers and wherein the two rollers of the second panel are received into the two longitudinal rails of the roof panel.

11. The roof assembly of claim 1, further comprising a back deflector, configured to be fixed onto the cabin, and wherein, in the backward position of the front deflector, the front deflector covers at least partially the back deflector, the back deflector being located between the roof panel and the front deflector.

12. The roof assembly of claim 11, wherein the roof assembly further comprises at least one sliding assembly, wherein the front deflector is slidably attached to the back deflector with the at least one sliding assembly and wherein the at least one sliding assembly is configured to guide the front deflector between its forward and backward positions.

13. The roof assembly of claim 12, wherein the at least one sliding assembly comprises:

a rail, the rail having an internal cavity and being fixed to the back deflector; and a slider, the slider projecting from the first deflector, an extremity of the slider being received inside the internal cavity of the rail, the slider being configured to move along the rail when the front deflector is moved between its forward and backward positions for guiding the front deflector between its forward and backward positions.

14. The roof assembly of claim 13, wherein the at least one sliding assembly further comprises spring-loaded teeth, each spring-loaded tooth being moveable between a closed position, in which the spring-loaded tooth locally closes the internal cavity of the rail, and an open position, in which the spring-loaded tooth does not close the internal cavity, each spring-loaded tooth being spring-loaded towards its closed position, and wherein the slider pushes back the spring-loaded teeth towards their open position when moving along the rail.

15. A road vehicle comprising the roof assembly of claim 1.

* * * * *